United States Patent
Niedert et al.

(10) Patent No.: US 11,607,919 B2
(45) Date of Patent: Mar. 21, 2023

(54) METHODS AND APPARATUS FOR A DUAL REACTING, SINGLE LOAD SENSING ELEMENT COUPLED TO A HITCH RECEIVER

(71) Applicant: Ford Global Technologies, LLC, Dearborn, MI (US)

(72) Inventors: Andrew Niedert, New Hudson, MI (US); Kevin Stanton Giaier, Sylvan Lake, MI (US); Elliott Pearson, Shelby Township, MI (US); Anton Rogness, Dearborn, MI (US); Johannes Gießibl, Amerang (DE); Chad Reed, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 85 days.

(21) Appl. No.: 16/987,089

(22) Filed: Aug. 6, 2020

(65) Prior Publication Data
US 2021/0039457 A1    Feb. 11, 2021

Related U.S. Application Data

(60) Provisional application No. 62/884,982, filed on Aug. 9, 2019.

(51) Int. Cl.
*B60D 1/24* (2006.01)
*B60D 1/48* (2006.01)

(52) U.S. Cl.
CPC ............ *B60D 1/248* (2013.01); *B60D 1/485* (2013.01)

(58) Field of Classification Search
CPC ...................................................... B60D 1/248
See application file for complete search history.

(56) References Cited

U.S. PATENT DOCUMENTS

| | | | |
|---|---|---|---|
| 5,511,812 A | 4/1996 | Milner | |
| 8,380,390 B2 | 2/2013 | Sy et al. | |
| 9,464,953 B2 | 10/2016 | Wirthlin | |
| (Continued) | | | |

FOREIGN PATENT DOCUMENTS

| | | |
|---|---|---|
| DE | 102014217801 | 3/2016 |
| EP | 2363307 | 9/2011 |
| WO | 2018171937 | 9/2018 |

OTHER PUBLICATIONS

Wirthlin, "Intelligent Hitch for Measuring Both Trailer Weight and Tongue Weight," Tech Briefs, Create the Future Design Contest 2017, 5 pages.

(Continued)

*Primary Examiner* — Kevin Hurley
(74) *Attorney, Agent, or Firm* — Lorne Forsythe; Hanley, Flight & Zimmerman LLC

(57) ABSTRACT

Methods and apparatus for a dual reacting, single load sensing element coupled to a hitch receiver are disclosed herein. An example apparatus includes a hitch configured to be coupled to a vehicle, the hitch including a crossbar, a receiver tube, and a pin housing coupled to the receiver tube. The pin housing includes a first pin including a load sensor, the first pin reacting loads in a first direction and a second direction and a second pin, the second pin reacting loads in the first direction, the first pin and the second pin acting as the only load path between the receiver tube and the crossbar.

20 Claims, 8 Drawing Sheets

(56) References Cited

U.S. PATENT DOCUMENTS

| | | | |
|---|---|---|---|
| 9,643,462 B2 | 5/2017 | McAllister | |
| 9,981,512 B2 | 5/2018 | Gentner | |
| 11,097,580 B2* | 8/2021 | Niedert | B60D 1/36 |
| 2013/0253814 A1* | 9/2013 | Wirthlin | G01G 19/02 |
| | | | 701/1 |
| 2014/0360282 A1 | 12/2014 | Giessibl | |
| 2015/0137482 A1 | 5/2015 | Woolf et al. | |
| 2019/0143769 A1 | 5/2019 | Niedert et al. | |
| 2019/0263204 A1* | 8/2019 | Reed | G01G 19/12 |
| 2019/0265112 A1 | 8/2019 | Reed et al. | |
| 2019/0344631 A1* | 11/2019 | Gießibl | B60D 1/62 |

OTHER PUBLICATIONS

United States Patent and Trademark Office, "Non-Final Office Action," dated Jul. 11, 2019 in connection with U.S. Appl. No. 15/815,640, 15 pages.

United States Patent and Trademark Office, "Notice of Allowance," dated Nov. 7, 2019 in connection with U.S. Appl. No. 15/815,640, 7 pages.

* cited by examiner

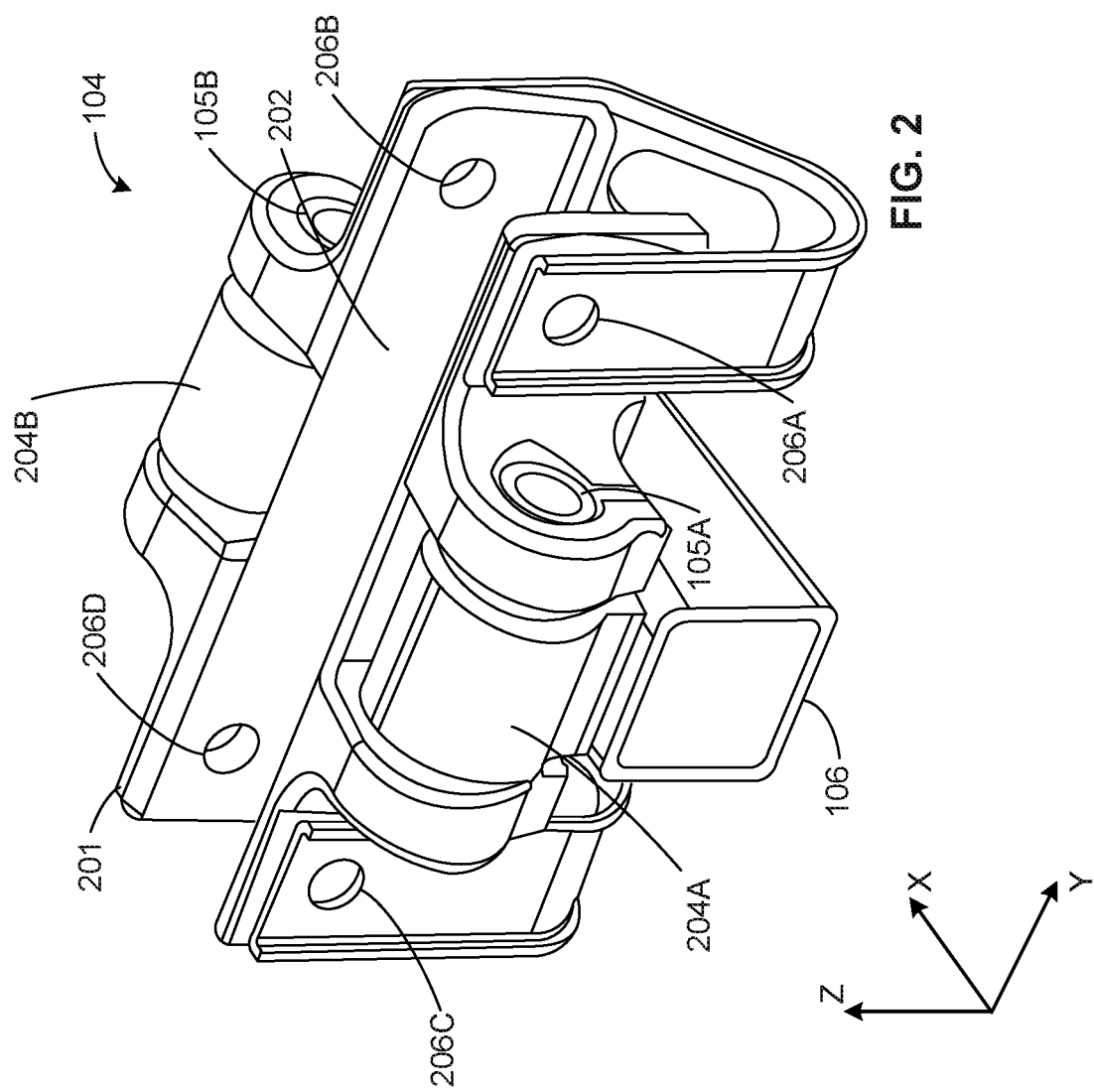

ure of FIG. 2.
METHODS AND APPARATUS FOR A DUAL REACTING, SINGLE LOAD SENSING ELEMENT COUPLED TO A HITCH RECEIVER

RELATED APPLICATION

This patent claims priority to U.S. Provisional Patent No. 62/884,982, which was filed on Aug. 9, 2019, and is entitled "LOAD SENSING ELEMENT COUPLED TO A HITCH RECEIVER." U.S. Provisional Patent 62/884,982 is hereby incorporated herein by reference in its entirety.

FIELD OF THE DISCLOSURE

This disclosure relates generally to vehicle hitches and, more particularly, to methods and apparatus for a dual reacting, single load sensing element coupled to a hitch receiver.

BACKGROUND

In recent years, consumer vehicles capable of pulling trailers have implemented additional data processing capabilities. With these capabilities, vehicles can process parameters of a vehicle and/or trailer not previously processed to provide additional insights to a user of the vehicle. For example, an additional parameter of the vehicle that can be processed is the load condition experienced at a hitch. The load condition includes various characteristics (e.g., weight, load orientation, braking force, etc.) experienced by the hitch.

Different vehicle models often have different configurations, including spare tire placement, fuel tank placement, floorboard height, frame rail spacing, etc. As a result, the hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle and often has a square cross-section. A crossbar is a tube connecting the driver and passenger sides of a vehicle to the receiver tube. Crossbars often have simple geometric cross-sections, such as a circle or a square.

SUMMARY

An example hitch disclosed herein includes a hitch configured to be coupled to a vehicle, the hitch comprising a crossbar, a receiver tube, and a pin housing coupled to the receiver tube, the pin housing including a first pin including a load sensor, the first pin reacting loads in a first direction and a second direction, and a second pin, the second pin reacting loads in the first direction, the first pin and the second pin acting as the only load path between the receiver tube and the crossbar.

An example apparatus disclosed herein includes a housing configured to be coupled to a crossbar and a receiver tube, a first pin adapter disposed within the housing, a second pin adapter disposed within the housing, a first pin including a load sensor, the first pin disposed within the first pin adapter, the first pin reacting loads in a first direction and a second direction, and a second pin, the second pin reacting loads in the first direction, the second pin disposed within the second pin adapter, the first pin and the second pin acting as the only load path between the receiver tube and the crossbar.

An example method disclosed herein includes determining a location of a hitch ball of a hitch based on a data received from a sensor of a first pin of the hitch, the hitch including a second pin, determining a load condition of the hitch based on the location and the data, and in response to the load condition satisfying an alert threshold, alerting a user of the load condition.

BRIEF DESCRIPTION OF THE DRAWINGS

FIG. 2 illustrates an isometric view of the load sensing pin housing of FIG. 1A.

Figure 1A:
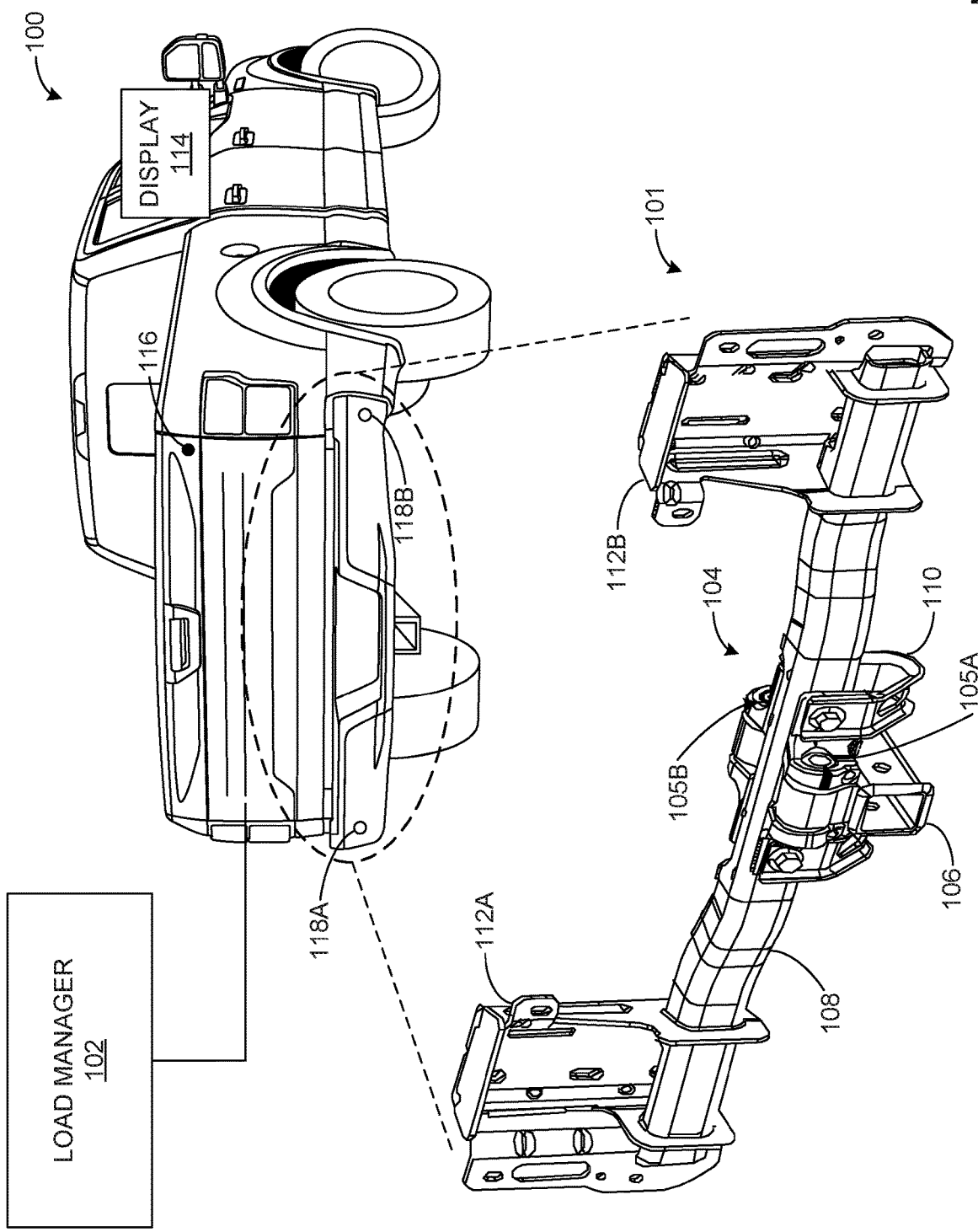
FIG. 1A illustrates an example vehicle including a hitch pin load manager and a pin adapter including load sensing pins by which the examples disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Various terms are used herein to describe the orientation of features. As used herein, the term "vertical" refers to the direction orthogonal to the ground (e.g., the driving surface of a vehicle, etc.). As used herein, the term "horizontal"

refers to the direction parallel to the direction of travel of the vehicle. As used herein, the term "lateral" refers to the direction orthogonal to the vertical and horizontal directions. As used herein, the orientation of features, forces and moments are described with reference to the vertical axis, horizontal axis, and lateral axis of the vehicle associated with these features, forces and moments. In general, the attached figures are annotated with a set of axes including the vertical axis Z, the horizontal axis X, and the lateral axis Y.

Many vehicle hitch designs are specific to individual vehicle models and, thus, can require components of the hitch to have unique shapes and parts specific to each vehicle model. Variations in hitch design between vehicle models can be attributed to the shape of the rear bumper housing, packaging requirements for the spare tire, floorboard height, frame rail spacing, etc. These variations in hitch design can make it difficult to package force-sensing elements (e.g., load-sensing pins, strain gauge, etc.) into a hitch. For example, each hitch design can require specifically designed force-sensing elements, which can increase manufacturing cost and reduce availability of replacement parts.

In some examples disclosed herein, a load sensing pin is used to determine the load condition of a trailer on a vehicle. Other load sensing elements such as pressure sensors, piezoelectric sensors, etc. are specifically tailored to the hitch (e.g., the hitch ball diameter, etc.) or the interaction between the vehicle and the trailer (e.g., ride height differences between the vehicle and trailer, etc.). Because hitch ball and/or drawbar diameter varies based on the coupled trailer, use of pressure sensors and piezoelectric sensors may not be practical. Accordingly, the examples disclosed herein include a load sensing pin that can be implemented on any vehicle and trailer configuration.

Examples disclosed herein address the above-noted problems by determining one or more load characteristics at the trailer hitch receiver with one load sensing pin disposed within a pin adapter coupled to a receiver tube. In some examples disclosed herein, the pin adapter is coupled to a crossbar via a housing. In some examples disclosed herein, a second non-load sensing pin is disposed within the pin adapter. In some examples disclosed herein, the pin adapter is shaped such that the pin adapter does not contact a horizontal surface of the non-load sensing pin. In some examples disclosed herein, the load sensing pin and the non-load sensing pin are at substantially the same vertical position relative to the crossbar. In some examples disclosed herein, the load sensing pin and the non-load sensing pin are at substantially the same horizontal position relative to the crossbar. In some examples disclosed herein, the geometry of the drawbar (e.g., the length, the drop, the cross-sectional shape, etc.) and/or hitch ball is determined by the sensors of the vehicle. In some examples disclosed herein, the geometry of the drawbar and/or hitch ball is input by a user of the vehicle.

In some examples disclosed herein, the housing, the crossbar and/or pin adapter can include various configurations that may depend on a type of vehicle model and/or trailer coupled to the vehicle. In some examples disclosed herein, the configurations of the housing, the crossbar and/or pin adapter can be altered to minimize the packaging space of the hitch assembly. In some examples disclosed herein, the use of a single load sensing pin and a non-load sensing pin reduces the overall packaging size requirements of the hitch when compared to hitch configurations with two load sensing pins. In some examples disclosed herein, the use of a single load sensing pin and a non-load sensing pin reduces the overall cost of the hitch. In some examples disclosed herein, the use of a single load sensing pin and a non-load sensing pin reduces the overall length of the vehicle and the departure angle of the vehicle. In some examples disclosed herein, the use of a single load sensing pin and a non-load sensing pin minimizes the hysteresis of the hitch sensor system by reducing the overall number of sensors required to determine the coupled load.

FIG. 1A illustrates an example vehicle 100 including an example load manager 102 and an example hitch 101. The example hitch 101 includes an example pin housing assembly 104 that includes an example first pin 105A and an example second pin 105B by which the examples disclosed herein may be implemented. In the illustrated example of FIG. 1A, the pin housing assembly 104 is coupled to an example receiver tube 106, an example crossbar 108 and an example chain bracket 110. In the illustrated example of FIG. 1A, the crossbar 108 is coupled to the vehicle 100 via an example first hitch mounting plate 112A and an example second hitch mounting plate 112B. The load manager 102 is communicatively coupled to at least one of an example display 114, an example camera 116, an example first parking sensor 118A, and/or an example second parking sensor 118B.

In the illustrated example of FIG. 1A, the vehicle 100 can tow a trailer coupled to the vehicle 100 via the hitch 101. For example, a tow ball can be coupled to the hitch 101 via the receiver tube 106. The coupled tow ball enables a trailer to be pivotally coupled to the hitch 101. In the illustrated example, the vehicle 100 is a consumer automobile. In other examples, the vehicle 100 can be a commercial truck, a motorcycle, a motorized cart, an all-terrain vehicle, a motorized scooter, a locomotive, or any other vehicle.

The load manager 102 receives load information (e.g., forces, torques, etc.) from the sensors associated with the vehicle and/or hitch 101 (e.g., first pin 105A, etc.). In some examples, the load manager 102 can analyze the received load information to determine a load condition of the vehicle 100 and/or the hitch 101. For example, the load manager 102 can determine a vertical load condition (e.g., a load condition in a direction orthogonal to the ground), a horizontal load condition (e.g., a load condition in a direction parallel to the receiver tube 106, etc.) and/or a lateral load condition (e.g., a load condition in a direction parallel to the crossbar 108, etc.). In some examples, if the load condition satisfies an alert threshold, the load manager 102 can generate an alert to indicate to a user of the vehicle 100 that the vehicle 100 is improperly loaded. In some examples, the load manager 102 can determine the geometry a drawbar coupled to the receiver tube 106. For example, the load manager 102 can use the camera 116 and/or the park sensors 118A, 118B to determine the geometry of a coupled drawbar. In other examples, the load manager 102 can use any other suitable means of determining the drawbar geometry of a coupled drawbar (e.g., via an input from a user of the vehicle 100, etc.). An example implementation of the load manager 102 is described below conjunction with FIG. 1B.

In the illustrated example of FIG. 1A, the example pin housing assembly 104 enables the pin housing assembly 104 to be coupled to the crossbar 108. In other examples, the pin housing assembly 104 can have any other suitable shape. In the illustrated example, the pin housing assembly 104 is coupled to the crossbar 108 via fasteners (e.g., bolts, screws, etc.). In other examples, any other suitable means of coupling the pin housing assembly 104 to the crossbar 108 can be used (e.g., a weld, a press fit, etc.). In the illustrated example, the pin housing assembly 104 is coupled to the receiver tube 106 via a weld, a press fit, one or lore fasteners and/or any other suitable means. In the illustrated example of FIG. 1A, the first pin 105A is press fit in the pin housing assembly 104 and the second pin 105B is welded in the pin housing assembly 104. In other examples, the first pin 105A and/or second pin 105B can be coupled to the housing in any other suitable manner.

The pins 105A, 105B are disposed within the example pin housing assembly 104. In the illustrated example of FIG. 1A, the pins 105A, 105B have circular cross-sections. In other examples, the pins 105A, 105B can have any other suitable cross-sectional shape. In some examples, the first pin 105A and/or the second pin 105B can have a hollow cross-section. In other examples, the pins 105A, 105B can have any other suitable cross-section (e.g., solid, etc.). In some examples, the diameters of the pins 105A, 105B can be changed depending on the load rating of the hitch 101. For example, if the hitch 101 is designed to tow a relatively heavy load, each of the example pins 105A, 105B can have an appropriate larger diameter. In some examples, to enable modularity of the hitch 101, the diameters and/or lengths of the pins 105A, 105B can be incremented and selected based on tow capacity of the hitch 101 (e.g., a hitch with a larger tow capacity may use pins with a large diameter, etc.). In the illustrated example of FIG. 1A, the pins 105A, 105B are at substantially the same vertical position relative to the example crossbar 108. Additionally or alternatively, the pins 105A, 105B are at substantially the same horizontal position relative to the example crossbar 108. An example hitch including the pins 105A, 105B at substantially the same horizontal position is described below in conjunction with FIG. 5.

In the illustrated example, the first pin 105A and the pin 105B, which is a non-load sensing pin, have the same shape and diameter. In some examples, the first pin 105A and the second pin 105B are composed of a ferrous material (e.g., high strength steel, etc.). In other examples, the first pin 105A and the second pin 105B can be any other suitable material. In some examples, the first pin 105A and the second pin 105B can have different diameters, lengths, cross-sections and/or load ratings. In some examples, the first pin 105A has a larger diameter than the second pin 105B because the second pin 105B does not include sensor elements. In such examples, the additional size of the pin 105A enables load sensing elements of the pin 105A to be packaged therein.

The crossbar 108 is a structural element that connects the pin housing assembly 104 to the vehicle 100. In the illustrated example, the crossbar 108 has a quadrilateral cross-section. In other examples, the example crossbar 108 can have any other suitable cross-section (e.g., polygonal, circular, ovoid, etc.). In the illustrated example, the crossbar 108 is a single continuous tube. In other examples, the crossbar 108 can be two tubes bisected by the pin housing assembly 104.

The chain bracket 110 acts as redundant attachment point between the hitch 101 and a trailer. For example, one or more chains or similar mechanical elements can be coupled to the hitch 101 and the chain bracket 110. In operation, if the primary coupling between the trailer and the hitch 101 fails (e.g., the coupling via the receiver tube 106, etc.), the chain(s) prevent the trailer from becoming detached from the hitch 101. In some examples, the chain bracket 116 can be absent.

The first hitch mounting plate 112A and the second hitch mounting plate 112B can be used to couple the hitch 101 to the vehicle 100. For example, the hitch mounting plates 112A, 112B can be coupled to the frame of the vehicle 100 via one or more fasteners. In other examples, the hitch mounting plates 112A, 112B can be coupled to the vehicle 100 via any other suitable means (e.g., a weld, etc.).

The load manager 102 can be communicatively coupled to the display 114. In some examples, the display 114 can be within an interior of the vehicle 100 (e.g., a dashboard display, an overhead display, etc.). Additionally or alternatively, the display 114 can be included in a mobile device (e.g., a smartphone, a tablet, a smartwatch, etc.) of an operator or a passenger of the vehicle 100. In some examples, the display 114 can display the load condition determined by the load manager 102. In some examples, the display 114 can present an alert to a user of the vehicle 100 when a load condition satisfies an alert threshold.

In the illustrated example, the load manager 102 is additionally coupled to the camera 116. In some examples, the camera 116 is mounted on an exterior surface of the vehicle 100 (e.g., the camera 116 is a backup assistance camera, etc.). In some examples, an output of the camera 116 can be used to determine the orientation of a trailer coupled to the hitch 101. While the camera 116 is illustrated as integrated with the vehicle 100 (e.g., integrated with the gate of vehicle 100, etc.), in other examples the camera 116 can be disposed at any other suitable location on the vehicle 100 and/or hitch 101.

In the illustrated example, the example load manager 102 is additionally coupled to the parking sensors 118A, 118B. The parking sensors 118A, 118B are proximity sensors that alert a user of the vehicle 100 of obstacles near the vehicle 100. In some examples, the parking sensors 118A, 118B are ultrasonic proximity detectors that measure the distance of obstacles via sonic pulses. In some examples, the parking sensors 118A, 118B can analyze reflected pulses to determine the location of obstacles near the vehicle 100. In some examples, the load manager 102 can analyze the reflected pulses to determine the location (e.g., the horizontal distance, the vertical drop, etc.) of a hitch ball coupled to the vehicle. While the parking sensors 118A, 118B are described herein as ultrasonic proximity sensors, the parking sensors 118A, 118B can be implemented by any other suitable type of sensor (e.g., electromagnetic sensors, optical sensors, capacitive sensors, radar, etc.) or combination thereof. In other examples, the parking sensors 118A, 118B can be absent.

Figure 1B:
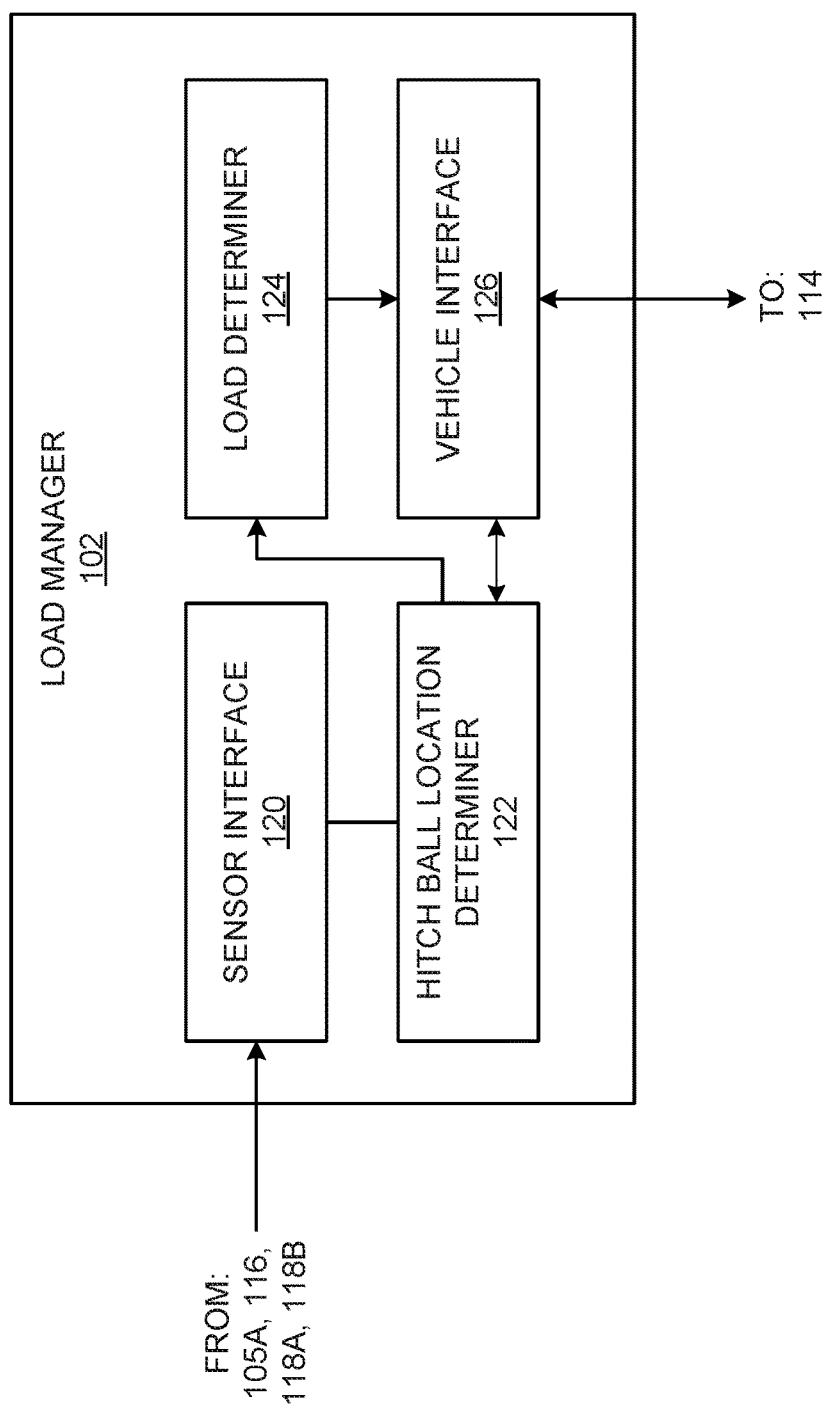
FIG. 1B is a block diagram of the example load manager of FIG. 1A.

FIG. 1B is a block diagram of the example load manager of FIG. 1A. In the illustrated example of FIG. 1B, the example load manager 102 includes an example sensor interface 120, an example hitch ball location determiner 122, an example load determiner 124, and an example vehicle interface 126.

The sensor interface 120 receives data from the first pin 105A, the camera 116, the parking sensors 118A, 118B and/or any other components of the vehicle 100 and/or hitch 101. In some examples, the sensor interface 120 can convert the data received from the components into a numerical form (e.g., human readable, etc.). For example, if the first pin 105A outputs an analog signal (e.g., an analog voltage, an analog current, etc.) the sensor interface 120 can convert the received data into values corresponding to the loads detected at the first pin 105A.

The hitch ball location determiner 122 determines the dimension of the coupled drawbar and/or hitch ball. For example, the hitch ball location determiner 122 can analyze the sensor readings of the parking sensors 118A, 118B to determine the location (e.g., the horizontal distance, the vertical drop, etc.) of a hitch ball coupled to the vehicle. In some examples, the hitch ball location determiner 122 can analyze the output of the camera 116 to determine the location of a hitch ball coupled to the vehicle 100. In some examples, the hitch ball location determiner 122 can receive an input from a user of the vehicle 100 indicating the location of a hitch ball coupled to the vehicle. In some examples, the user of the vehicle 100 can measure the drawbar using a mobile device application. In such examples, the hitch ball location determiner 122 can communicate with the mobile device application to receive the drawbar dimensions and/or hitch ball location.

The load determiner 124 analyzes the received load signal(s) from the sensor interface 120 to determine the vertical load condition of the vehicle 100, the horizontal load condition of the vehicle 100 and/or the lateral load condition of the vehicle 100. In some examples, the load determiner 124 can further base the load determination on the drawbar dimensions determined by the hitch ball location determiner 122. For example, the load determiner 124 can use static equilibrium analysis (e.g., force balancing, moment balancing, etc.) to determine the load applied to the hitch 101. In some examples, the load determiner 124 can determine if load condition satisfies an alert threshold. In some examples, the alert threshold corresponds to an improper (e.g., misload, unbalanced, overloaded, etc.) load condition.

The vehicle interface 126 generates a notification to be presented to a user of the vehicle 100. For example, the vehicle interface 126 can generate an alert if the load determiner 124 determines that an alert threshold is satisfied. In some examples, the vehicle interface 126 can generate a visual alert to be presented to the user via the display 114. Additionally or alternatively, the vehicle interface 126 can generate an auditory alert to be presented to the user (e.g., the alert may be presented over speakers of the vehicle 100, a mobile device of the user, etc.). In some examples, the vehicle interface 126 can generate instructions indicating to the user how to correct the load condition. In some examples, the vehicle interface 126 can enable the load manager 102 to receive data from the vehicle 100. For example, the vehicle interface 126 can receive the drawbar dimensions from the vehicle 100 (e.g., input by a user into the interface of the vehicle 100, etc.). In some examples, the vehicle interface 126 can receive data from sensors associated with the vehicle 100 (e.g., accelerometers, ride height sensors, etc.).

While an example manner of implementing the load manager 102 of FIG. 1A is illustrated in FIG. 1B, one or more of the elements, processes and/or devices illustrated in FIG. 1B may be combined, divided, re-arranged, omitted, eliminated and/or implemented in any other way. Further, the example sensor interface 120, the example drawbar dimension determiner 122, an example load determiner 124, and the example vehicle interface 126 and/or, more generally, the example load manager 102 of FIG. 1B may be implemented by hardware, software, firmware and/or any combination of hardware, software and/or firmware. Thus, for example, any of the example sensor interface 120, the example drawbar dimension determiner 122, an example load determiner 124, and the example vehicle interface 126 and/or, more generally, the example load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 120, the example drawbar dimension determiner 122, an example load determiner 124, and the example vehicle interface 126 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 102 of FIG. 1A may include one or more elements, processes and/or devices in addition to, or instead of, those illustrated in FIG. 1B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2 illustrates an isometric view of the example pin housing assembly 104 by which the examples disclosed herein can be implemented. In the illustrated example, the pin housing assembly 104 includes an example pin housing 201. The pin housing 201 includes an example channel 202 to enable the coupling of a crossbar (e.g., 108 of FIG. 1A) to be coupled the pin housing assembly 104. The pin housing assembly 104 further includes an example first pin adapter 204A and an example second pin adapter 204B. In the illustrated example, a continuous crossbar can be coupled to the pin housing 201 via a first bolt that passes through an example first aperture 206A and an example second aperture 206B and a second bolt that passes through an example third aperture 206C and an example fourth aperture 206D.

In the illustrated example of FIG. 2, the first pin adapter 204A is disposed on a rear-side (e.g., a trailer side, etc.) of the channel 202 and the second pin adapter 204B is disposed on a front side (e.g., a vehicle side, etc.) of the channel 202. In the illustrated example, the first pin 105A is coupled to the first pin adapter 204A and the second pin 105B (i.e., the non-load sensing pin) is coupled to the second pin adapter 204B. In the illustrated example, each of the first pin adapter 204A and the second pin adapter 204B are each coupled to the receiver tube 106 via a weld, fastener and/or any other suitable means. In some examples, the first pin adapter 204A and the second pin adapter 204B are provided in a unitary part. In the illustrated example, the pins 105A, 105B are at substantially the same vertical position relative to the receiver tube 106.

Figure 3:
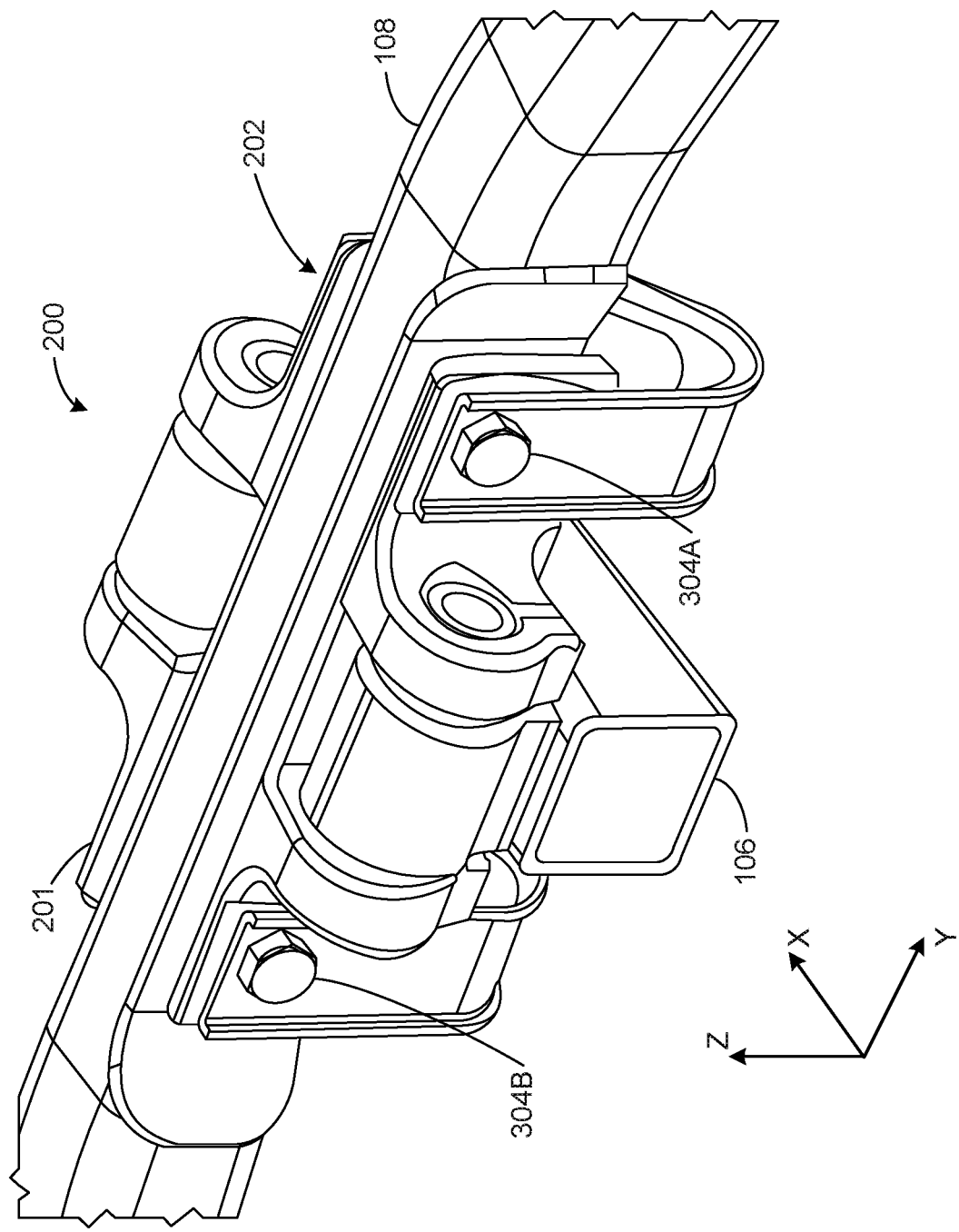
FIG. 3 illustrates an isometric view of the load sensing pin housing coupled to a crossbar.

FIG. 3 illustrates an isometric view of the pin housing 201 of FIG. 2 coupled to the crossbar 108. In the illustrated example, the crossbar 108 is disposed within the channel 202 and coupled to pin housing 201 via an example first fastener 304A and an example second fastener 304B. In the illustrated examples, the fasteners 304A, 304B are bolts. In other examples, the fasteners 304A, 304B can be any other suitable type of fastener (e.g., screws, rivets, etc.). In some examples, the pins 105A, 105B act as the only load path between the receiver tube 106 and the crossbar 108. In the illustrated example, the crossbar 108 is flush with both sides of the housing 201 (e.g., the vehicle and hitch sides of housing 201, etc.). In some examples, the fasteners 304A, 304B and corresponding apertures are absent. In such examples, the crossbar 108 can be coupled to the housing 201 via any other suitable means (e.g., weld, press fit, chemical adhesive, etc.).

Figure 4:
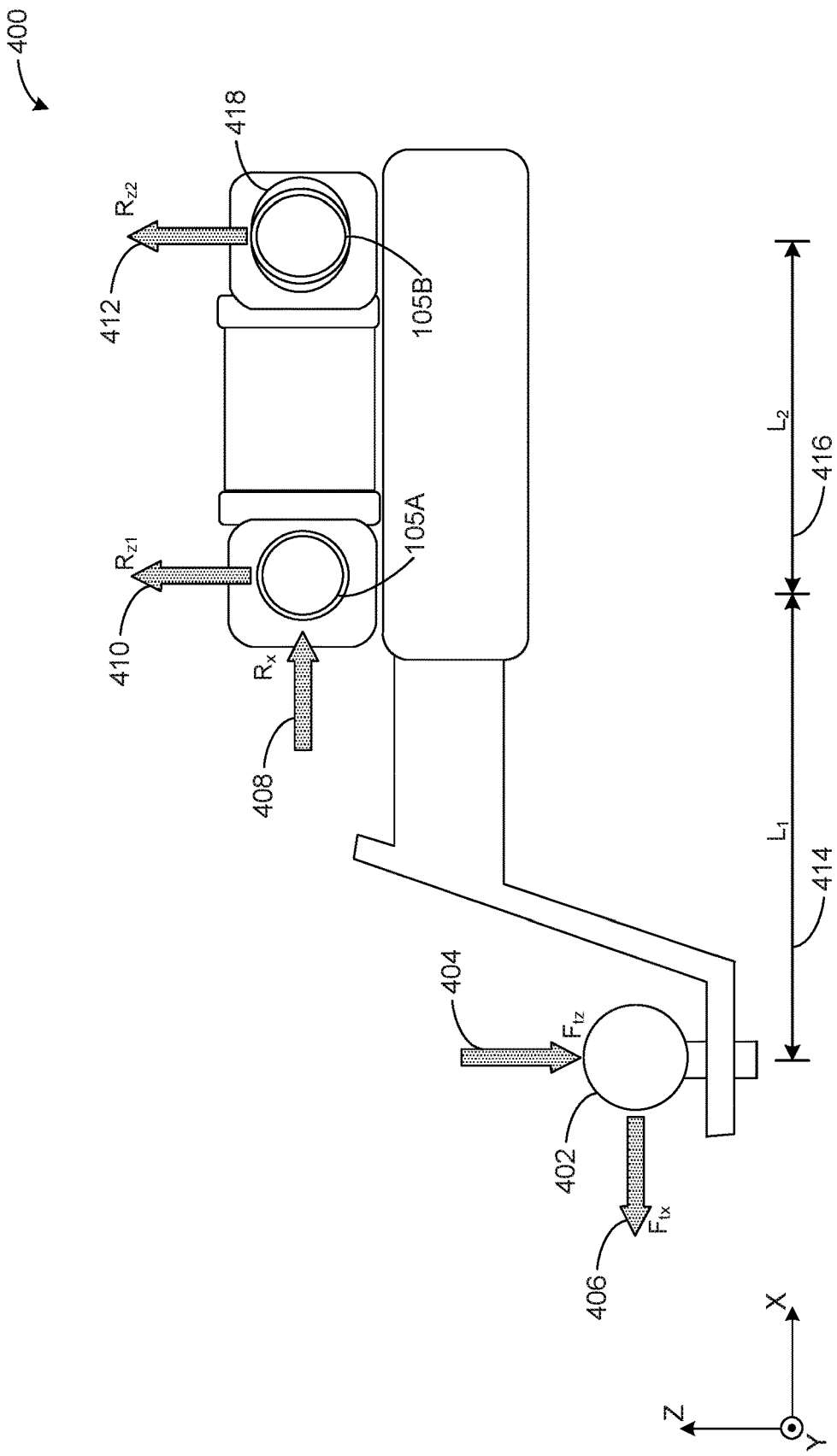
FIG. 4 illustrates an example loading condition on a hitch ball associated with a trailer and the corresponding pin adapter struct

FIG. 4 illustrates a side view of an example loading condition 400 on the example hitch 101 of FIG. 1A associated with a trailer and the corresponding reaction force on the pins 105A, 105B. In the illustrated example of FIG. 4, the load condition 400 is based on a load applied to an example hitch ball 402, where the load is transmitted to a crossbar via the pins 105A, 105B. In the illustrated example, the load condition 400 is based on an example applied vertical load 404 and an example applied horizontal load 406 applied at the hitch ball 402, an example horizontal reaction load 408 and an example first vertical reaction load 410 at the first pin 105A, and an example second vertical reaction load 412 at the second pin 105B. In the illustrated example of FIG. 4, the hitch ball 402 is displaced horizontally from the first pin 105A by an example first length 414 (e.g., a drawbar length) and the second pin 105B is spaced from the first pin 105A by an example second length 416.

In the illustrated example, the first pin 105A reacts (e.g., carries, etc.) the horizontal reaction load 408 and the example first vertical reaction load 410. In the illustrated example, the second pin 105B reacts (e.g., carries, etc.) the example second vertical reaction load 412. In some examples, the second pin 105B does not carry a horizontal reaction load because an example opening 418 is shaped to prevent the second pin 105B from carrying a horizontal load. In the illustrated example, the opening 418 is oblong (e.g., elliptical, ovoid, etc.) which prevents a horizontal contact between first pin 105A and rest of the hitch 101. In some examples, the opening 418 has a major axis (e.g., the relatively longer axis, etc.) aligned along the horizontal axis and a minor axis (e.g., the relatively shorter axis, etc.) aligned along the vertical axis. In some examples, the opening 418 is shaped in a manner to prevent horizontal contact in any loading scenario (e.g., the deflection caused by the coupled trailer, etc.).

In some examples, the first vertical reaction load 410 and the horizontal reaction load 408 are measured by the example first pin 105A. In some examples, because the second pin 105B does not include sensor elements, the second vertical reaction load 412 is not measured by a sensor and, thus, is not available to the load manager 102. In some examples, the load manager 102 can use static equilibrium analysis (e.g., torque balancing, force balancing, etc.) to determine a magnitude of the applied loads 404, 406. For example, the applied horizontal load 406 can be calculated using Equation (1):

$$\Sigma F_x = R_x - F_{tx} = 0 \quad (1)$$

where $\Sigma F_x$ is the sum of the forces in the horizontal direction, $F_{tx}$ is the applied horizontal load 406 and $R_x$ is the horizontal reaction load 408. In this example, the applied horizontal load 406 is equal and opposite to the horizontal reaction load 408. Similarly, the applied horizontal load 406 can be determined using static analysis via Equation 2:

$$F_{tz} = \frac{R_{z1}(L_1)}{L_2} \quad (2)$$

where $\Sigma F_z$ is the sum of the forces in the vertical direction, $F_{tz}$ is the applied vertical load 404, $R_{z1}$ is the first vertical reaction load 410, $L_1$ is the first length 414 and $L_2$ is the second length 416. In some examples, the load manager 102 can determine an applied lateral load. In some examples, the load manager 102 can determine the applied lateral load as a function of the applied horizontal load 406.

In some examples, the shape of the example opening 418 makes the load condition 400 of the hitch 101 statically determinate (e.g., determinable using equilibrium analysis, etc.). In the illustrated example of FIG. 4, the opening 418 and second pin 105B are forward (e.g., towards the front of the vehicle, etc.) the first pin 105A. In other examples, the opening 418 and second pin 105B can be behind (e.g., towards the rear of the vehicle, etc.) the first pin 105A.

In some examples, the load manager 102 can incorporate rear view camera data to assist in determining the applied loads 404, 406. For example, the load manager 102 can determine the lengths 414, 416 (e.g., the position of the tow ball, etc.) using the camera 116. Additionally or alternatively, the load manager 102 can determine the lengths 414, 416 using the parking sensors 118A, 118B. In some examples, an operator of the vehicle 100 can manually measure the lengths 414, 416 and input them to the load manager 102 (e.g., via an interface presented via the display 114, etc.). In some examples, an operator of the vehicle 100 can input a model of the drawbar and/or hitch ball 402 into the load manager 102 (e.g., via an interface presented via the display 114, etc.). In such examples, the load manager 102 can associate the model of the drawbar and/or hitch ball 402 with the lengths 414, 416.

Figure 5:
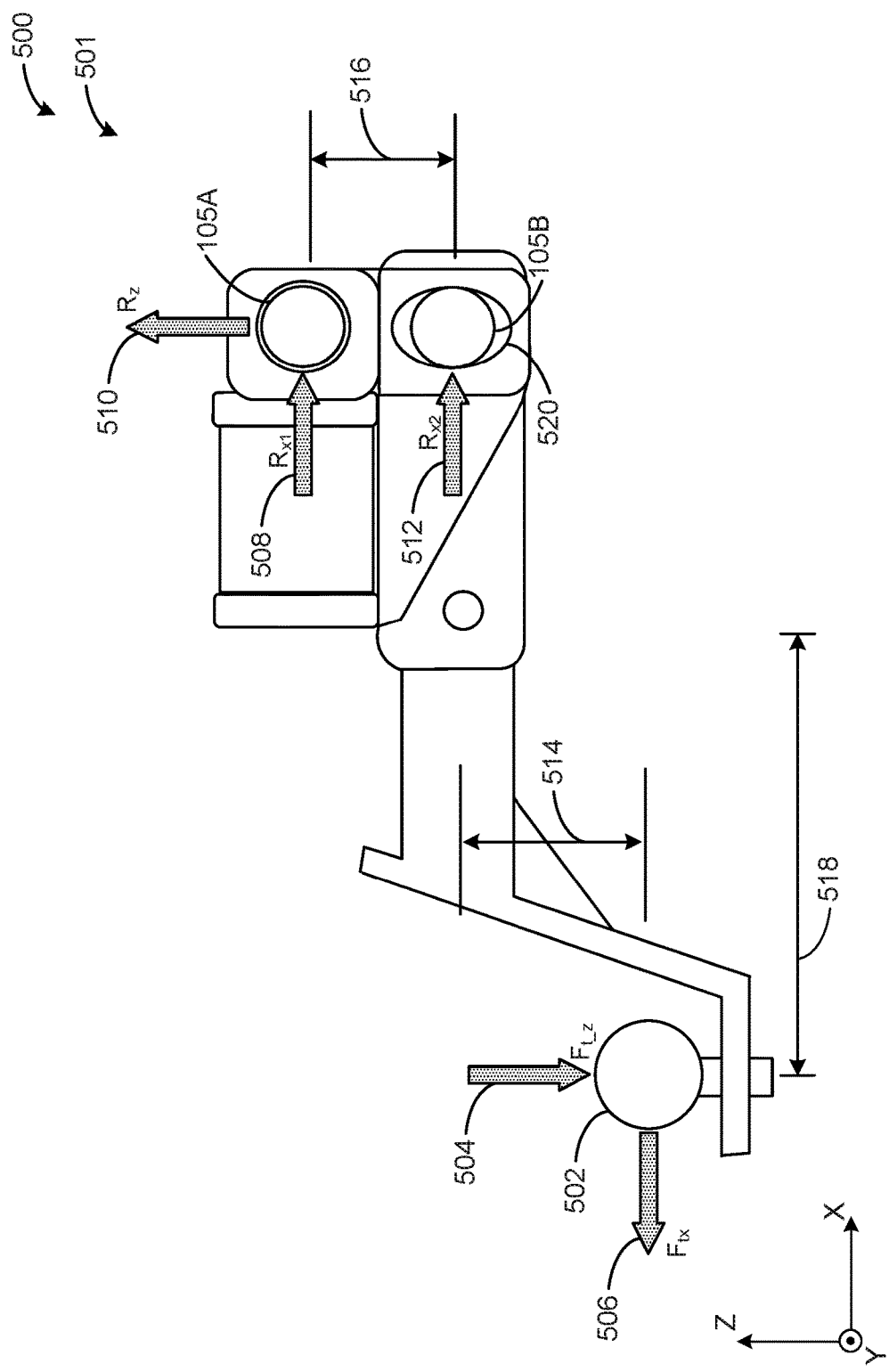
FIG. 5 illustrates an example loading condition on a hitch ball associated with a trailer and an alternative pin load sensing pin adapter structure.

FIG. 5 illustrates a side view of an example loading condition 500 on an example hitch 501 associated with a trailer and the corresponding reaction force on the pins 105A, 105B. In the illustrated example of FIG. 5, the load condition 500 is based on a load applied to an example hitch ball 502, where the load is transmitted to a crossbar via the pins 105A, 105B. In the illustrated example, the load condition 500 is based on an example vertical load 504 and an example horizontal load 506 applied at the hitch ball 502, an example first horizontal reaction load 508 and an example vertical reaction load 510 at the first pin 105A, and an example second horizontal reaction load 512 at the second pin 105B. In the illustrated example of FIG. 5, the hitch ball 502 is displaced vertically from the second pin 105B by an example first length 514 (e.g., a drawbar drop), the first pin 105A is displaced vertically from the second pin 105B by an example second length 516 (e.g., a pin spacing, etc.), and the hitch ball 502 is horizontally displaced from the hitch by an example third length 518.

In the illustrated example of FIG. 5, the first pin 105A reacts (e.g., carries, etc.) the example first horizontal reaction load 508 and the example vertical reaction load 510. In the illustrated example, the second pin 105B (e.g., carries, etc.) the example second horizontal reaction load 512. In some examples, the second pin 105B does not carry a vertical reaction load because an example opening 520 is shaped to prevent the first pin 105A from carrying a vertical load. In the illustrated example, the opening 520 is oblong (e.g., elliptical, ovoid, etc.) which prevents a vertical contact between the second pin 105B and rest of the hitch 101. That is, the opening 418 has a major axis (e.g., the relatively longer axis, etc.) aligned along the vertical axis and a minor axis (e.g., the relatively shorter axis, etc.) aligned along the horizontal axis. In some examples, the opening 520 is shaped in a manner to prevent vertical contact in any loading scenario (e.g., the deflection caused by the coupled trailer, etc.).

In some examples, the first horizontal reaction load 508 and the vertical reaction load 510 are measured by the example first pin 105A. In some examples, because the second pin 105B does not include sensor elements, the second horizontal reaction load 512 is not measured by a sensor and, thus, is not available to the load manager 102. In some examples, the load manager 102 can use static equilibrium analysis (e.g., torque balancing, force balancing, etc.) to determine a magnitude of the applied loads 504, 506. For example, the applied vertical load 504 can be calculated using Equation (3):

$$\Sigma F_z = R_z - F_{tz} = 0 \quad (3)$$

where $\Sigma F_z$ is the sum of the forces in the vertical direction, $F_{tz}$ is the applied vertical load 504 and $R_x$ is the vertical reaction load 510. In this example, the applied vertical load 504 is equal and opposite to the vertical reaction load 510. Similarly, the applied horizontal load 506 can be determined using static analysis via Equation (4):

$$F_{tx} = \frac{R_{x1}(L_1)}{L_2} \quad (4)$$

where $F_{tx}$ is the applied horizontal load 506, $R_{x1}$ is the first horizontal reaction load 508, $L_1$ is the first length 514 and $L_2$ is the second length 516. In some examples, the load manager 102 can determine a lateral applied load. In some examples, the load manager 102 can determine the lateral load as a function of the applied horizontal load 506 and the third length 518.

In some examples, the shape of the example opening 520 makes the load condition of the hitch 101 statically determinate (e.g., determinable via static analysis, etc.). In the illustrated example of FIG. 5, the opening 520 and second pin 105B are below (e.g., vertically lower, etc.) than the first pin 105A. In other examples, the opening 520 and second pin 105B can be above (e.g., vertically higher, etc.) the first pin 105A.

In some examples, the load manager 102 can incorporate rear view camera data to assist in determining the applied loads 504, 506. For example, the load manager 102 can determine the lengths 514, 516, 518 (e.g., the position of the tow ball, etc.) using the camera 116. Additionally or alternatively, the load manager 102 can determine the lengths 514, 516, 518 using the parking sensors 118A, 118B. In some examples, an operator of the vehicle 100 can manually measure the lengths 514, 516, 518 and input them to the load manager 102 (e.g., via an interface presented via the display 114, etc.). In some examples, an operator of the vehicle 100 can input a model of the drawbar and/or hitch ball 502 into the load manager 102 (e.g., via an interface presented via the display 114, etc.). In such examples, the load manager 102 can associated the model of the drawbar and/or hitch ball 502 with the lengths 514, 516, 518.

Figure 6:
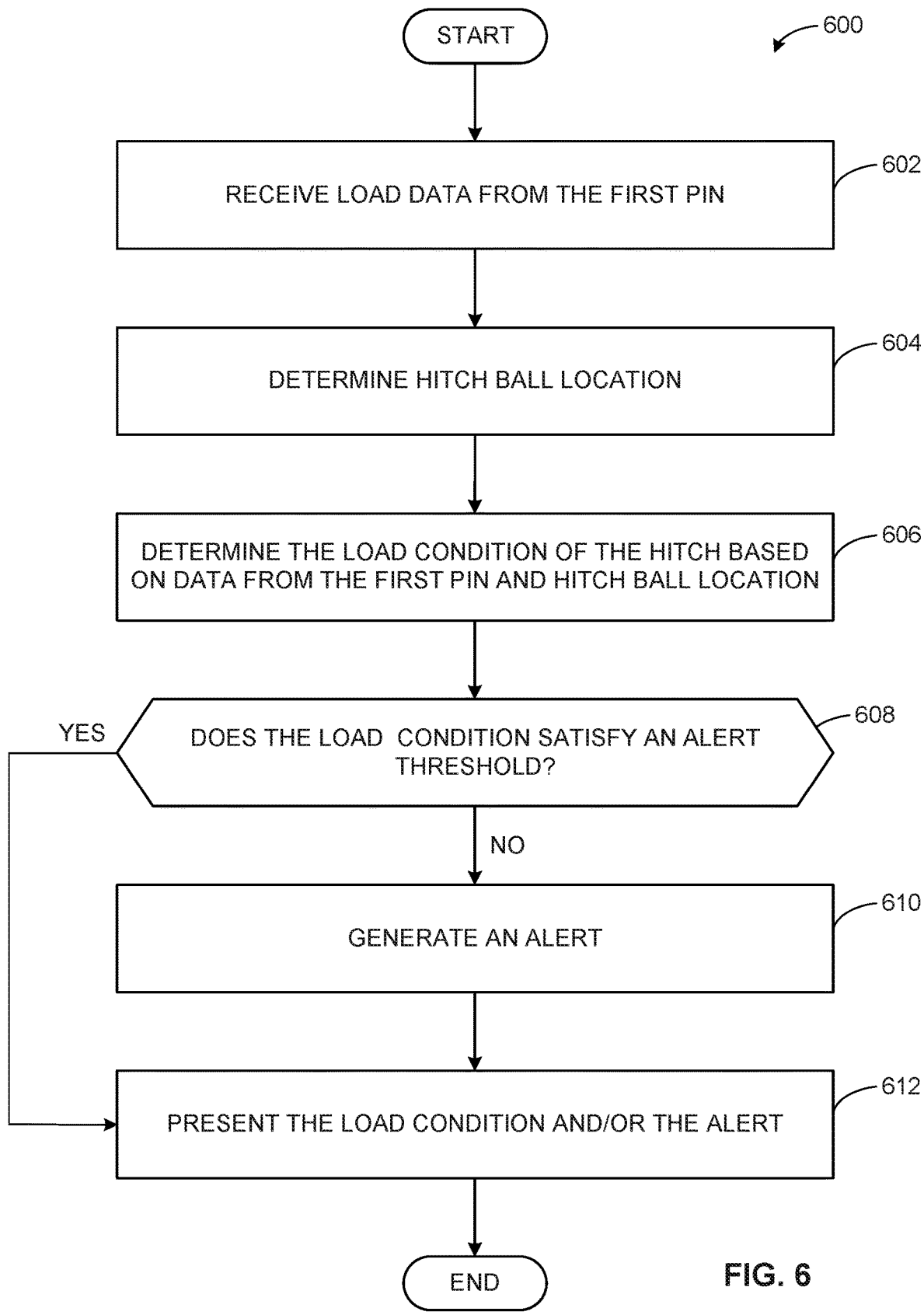
FIG. 6 is a flowchart representative of machine readable instructions that may be executed to implement the load manager of FIG. 1B.

A flowchart representative of example methods, hardware implemented state machines, and/or any combination thereof for implementing the load manager 102 of FIG. 1B is shown in FIG. 6. The method may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example method 600 of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The method 600 of FIG. 6 begins at block 602. At block 602, the sensor interface 120 receives load data from the first pin 105A. For example, the sensor interface 120 can receive data from the first pin 105A in an analog format (e.g., a voltage, etc.). In this example, the sensor interface 120 converts the analog format into a digital value (e.g., a force, a pressure, etc.).

At block 604, the hitch ball location determiner 112 determines the location of the hitch ball. For example, the hitch ball location determiner 112 can analyze the sensor readings of the parking sensors 118A, 118B to determine the location (e.g., the horizontal distance, the vertical drop, etc.) of a hitch ball coupled to the vehicle. In some examples, the hitch ball location determiner 112 can analyze the output of the camera 116 to determine the location of a hitch ball coupled to the vehicle 100. In some examples, the hitch ball location determiner 112 can receive an input from a user of the vehicle 100 indicating the location of a hitch ball coupled to the vehicle 100. In such examples, the input can indicate the model and/or location measurements for the hitch ball and/or hitch bar.

At block 606, the load determiner 124 load condition of the hitch 101 based on the data from the first pin 105A and hitch ball location. For example, the load determiner 124 can determine the load condition on the hitch 101 using static equilibrium analysis. For example, the load determiner 124 can use Equations (1)-(4) to determine the load condition. In some examples, the load determiner 124 can determine at least one of the vertical load condition, the horizontal load condition, and/or the lateral load condition. In other examples, the load determiner 124 can use any other suitable means to determine the load condition.

At block 608, the load determiner 124 determines if the load condition satisfies an alert threshold. If the load determiner 124 determines the load condition satisfies an alert threshold, the method 600 advances to block 610. If the load determiner 124 determines the load condition does not satisfies an alert threshold, the method 600 advances to block 612.

At block 610, the load determiner 124 generates an alert. For example, load determiner 124 can generate an audio alert, a visual alert, etc. In some examples, load determiner 124 can generate an alert including a description of the load condition triggering the alert. In some examples, load determiner 124 can generate an instruction indicating how to correct the load condition.

At block 612, the example vehicle interface 126 presents the load condition and/or alert. For example, the vehicle interface 126 can cause the vehicle 100 to present the load condition and/or the alert. For example, the vehicle interface 126 can cause the example display 114 to present the generated alert to a user of the vehicle 100.

Figure 7:
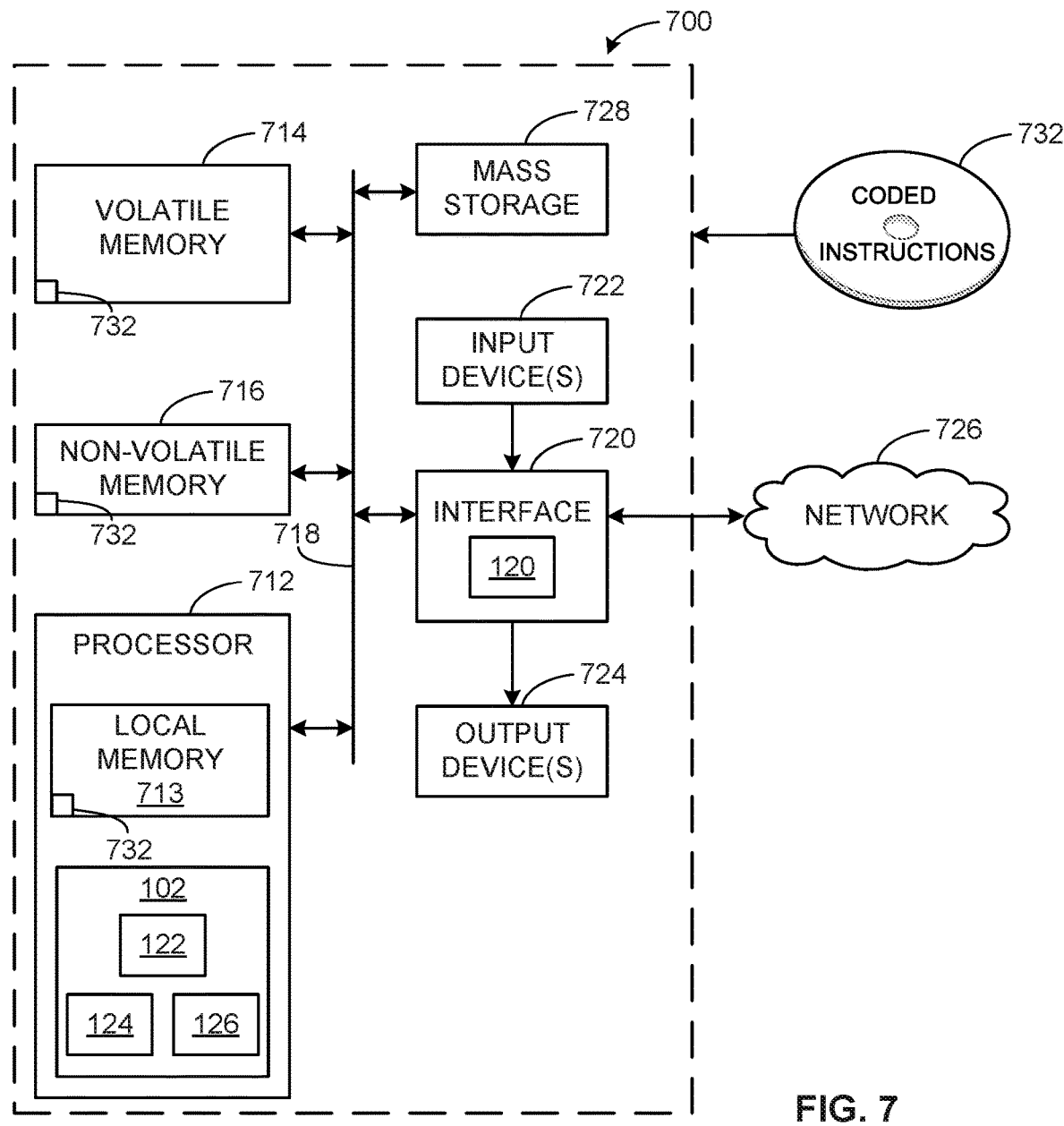
FIG. 7 is a block diagram of an example processing platform structured to execute the instructions of FIG. 6 to implement the load manager of FIG. 1B.

FIG. 7 is a block diagram of an example processor platform 700 structured to execute the method 600 of FIG. 6 to implement the load manager 102 of FIG. 1B. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example hitch ball location determiner 122, an example load determiner 124, and the example vehicle interface 126.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In this example, the interface circuit 720 implements the sensor interface 120.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 7 may be stored in the mass storage device 728, in the volatile memory 714, in the non-volatile memory 716, and/or on a removable non-transitory computer readable storage medium such as a CD or DVD.

Example methods, apparatus, systems, and articles of manufacture for a dual reacting, single load sensing element coupled to a hitch receiver are disclosed herein. Further examples and combinations thereof include the following:

Example 1 includes a hitch configured to be coupled to a vehicle, the hitch comprising a crossbar, a receiver tube, and a pin housing coupled to the receiver tube, the pin housing including a first pin including a load sensor, the first pin reacting loads in a first direction and a second direction, and a second pin, the second pin reacting loads in the first direction, the first pin and the second pin acting as the only load path between the receiver tube and the crossbar.

Example 2 includes the hitch of example 1, wherein the second pin does not include a load sensor.

Example 3 includes the hitch of example 1, wherein the first pin is disposed in a first opening of the pin housing and the second pin is disposed in a second opening of the pin housing, the second opening shaped to prevent the second pin from reacting a load in the second direction.

Example 4 includes the hitch of example 3, wherein the first opening and the second opening are aligned along a vertical axis of the hitch.

Example 5 includes the hitch of example 4, wherein the second opening is oblong and has a major axis aligned along the vertical axis.

Example 6 includes the hitch of example 3, wherein the first opening and the second opening are aligned along a horizontal axis of the hitch.

Example 7 includes the hitch of example 6, wherein the second opening is oblong and has a major axis aligned along a horizontal axis.

Example 8 includes the hitch of example 6, wherein the crossbar is disposed in a channel defined by the pin housing, the first pin and second pin are disposed on opposing sides of the crossbar.

Example 9 includes the hitch of example 1, wherein the crossbar is continuous and is coupled to the pin housing via at least one fastener.

Example 10 includes an apparatus, comprising a housing configured to be coupled to a crossbar and a receiver tube, a first pin adapter disposed within the housing, a second pin adapter disposed within the housing, a first pin including a load sensor, the first pin disposed within the first pin adapter, the first pin reacting loads in a first direction and a second direction, and a second pin, the second pin reacting loads in the first direction, the second pin disposed within the second pin adapter, the first pin and the second pin acting as the only load path between the receiver tube and the crossbar.

Example 11 includes the apparatus of example 10, wherein the second pin does not include a load sensor.

Example 12 includes the apparatus of example 10, wherein the first pin is disposed in a first opening of the pin housing and the second pin is disposed in a second opening of the pin housing, the second opening shaped to prevent the second pin from reacting a load in the second direction.

Example 13 includes the apparatus of example 12, wherein the first opening and the second opening are aligned along a vertical axis of the hitch.

Example 14 includes the apparatus of example 13, wherein the second opening is oblong and has a major axis aligned along the vertical axis.

Example 15 includes the apparatus of example 12, wherein the first opening and the second opening are aligned along a horizontal axis of the hitch.

Example 16 includes the apparatus of example 15, wherein the second opening is oblong and has a major axis aligned along a horizontal axis.

Example 17 includes the apparatus of example 10, wherein the housing defines a channel, the channel configured to receive a crossbar of a hitch.

Example 18 includes a method comprising determining a location of a hitch ball of a hitch based on a data received from a sensor of a first pin of the hitch, the hitch including a second pin, determining a load condition of the hitch based on the location and the data, and in response to the load condition satisfying an alert threshold, alerting a user of the load condition.

Example 19 includes the method of example 18, wherein the second pin does not include a sensor.

Example 20 includes the method of example 18, wherein the first pin is disposed in a first opening of the pin housing and the second pin is disposed in a second opening of the pin housing, the second opening shaped to prevent the second pin from reacting a load in the second direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hitch configured to be coupled to a vehicle, the hitch comprising:
   a crossbar;
   a receiver tube;
   a first pin adapter;
   a second pin adapter; and
   a pin housing coupled to the receiver tube, the pin housing including:
      a first pin including a load sensor, the first pin disposed within the first pin adapter, the first pin reacting loads in a first direction and a second direction; and
      a second pin, the second pin disposed within the second pin adapter, the second pin reacting loads in the first direction, the first pin and the second pin acting as the only load path between the receiver tube and the crossbar.

2. The hitch of claim 1, wherein the second pin does not include a load sensor.

3. The hitch of claim 1, wherein the first pin is disposed in a first opening of the pin housing and the second pin is disposed in a second opening of the pin housing, the second opening shaped to prevent the second pin from reacting a load in the second direction.

4. The hitch of claim 3, wherein the first opening and the second opening are aligned along a vertical axis of the hitch.

5. The hitch of claim 4, wherein the second opening is oblong and has a major axis aligned along the vertical axis.

6. The hitch of claim 3, wherein the first opening and the second opening are aligned along a horizontal axis of the hitch.

7. The hitch of claim 6, wherein the second opening is oblong and has a major axis aligned along the horizontal axis.

8. The hitch of claim 6, wherein the crossbar is disposed in a channel defined by the pin housing, the first pin and the second pin are disposed on opposing sides of the crossbar.

9. The hitch of claim 8, wherein the crossbar is flush with a vehicle side and a hitch side of the pin housing.

10. The hitch of claim 1, wherein the crossbar is continuous and is coupled to the pin housing via at least one fastener.

11. An apparatus, comprising:
    a housing configured to be coupled to a crossbar and a receiver tube;
    a first pin adapter disposed within the housing;
    a second pin adapter disposed within the housing;

a first pin including a load sensor, the first pin disposed within the first pin adapter, the first pin reacting loads in a first direction and a second direction; and a second pin, the second pin reacting loads in the first direction, the second pin disposed within the second pin adapter, the first pin and the second pin acting as the only load path between the receiver tube and the crossbar.

12. The apparatus of claim 11, wherein the second pin does not include a load sensor.

13. The apparatus of claim 11, wherein the first pin is disposed in a first opening of the first pin adapter and the second pin is disposed in a second opening of the second pin adapter, the second opening shaped to prevent the second pin from reacting a load in the second direction.

14. The apparatus of claim 13, wherein the first opening and the second opening are aligned along a vertical axis.

15. The apparatus of claim 14, wherein the second opening is oblong and has a major axis aligned along the vertical axis.

16. The apparatus of claim 13, wherein the first opening and the second opening are aligned along a horizontal axis.

17. The apparatus of claim 16, wherein the second opening is oblong and has a major axis aligned along the horizontal axis.

18. The apparatus of claim 11, wherein the housing defines a channel, the channel configured to receive the crossbar.

19. The apparatus of claim 18, wherein the first pin and the second pin are disposed on opposing sides of the channel.

20. The apparatus of claim 18, wherein the first pin has a same diameter as the second pin.

* * * * *